United States Patent
Hwang et al.

(10) Patent No.: US 11,338,199 B2
(45) Date of Patent: May 24, 2022

(54) INTERACTIVE LATENCY MEASUREMENT

(71) Applicant: AT&T Intellectual Property I, L.P., Atlanta, GA (US)

(72) Inventors: Michael Hwang, New Providence, NJ (US); Sannan Tariq, Pittsburgh, PA (US); Christopher Rath, Hillsborough, NJ (US); Rittwik Jana, Montville, NJ (US); Shu Shi, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 94 days.

(21) Appl. No.: 16/793,282

(22) Filed: Feb. 18, 2020

(65) Prior Publication Data
US 2021/0252394 A1    Aug. 19, 2021

(51) Int. Cl.
*A63F 13/335* (2014.01)
*A63F 13/355* (2014.01)

(52) U.S. Cl.
CPC .......... *A63F 13/335* (2014.09); *A63F 13/355* (2014.09); *A63F 2300/534* (2013.01); *A63F 2300/535* (2013.01); *A63F 2300/538* (2013.01)

(58) Field of Classification Search
CPC ................. A63F 13/335; A63F 13/355; A63F 2300/534; A63F 2300/558; A63F 2300/535
See application file for complete search history.

(56) References Cited

U.S. PATENT DOCUMENTS

| | | | | |
|---|---|---|---|---|
| 2013/0223254 | A1* | 8/2013 | Oguchi ................. | H04L 47/283 370/252 |
| 2015/0106504 | A1* | 4/2015 | Astigarraga .......... | H04L 41/046 709/224 |
| 2016/0180811 | A1* | 6/2016 | Colenbrander ........... | G06T 7/90 345/207 |
| 2020/0042596 | A1* | 2/2020 | Ravi ........................ | G06N 3/04 |

OTHER PUBLICATIONS

Chen et al. "Measuring the latency of cloud gaming systems," Proceedings of the 19th ACM international conference on Multimedia, Nov. 2011, 5 pages.

* cited by examiner

*Primary Examiner* — James S. McClellan
(74) *Attorney, Agent, or Firm* — Amin, Turocy & Watson, LLP

(57) ABSTRACT

The described technology is generally directed towards techniques to measure interaction latency. Interaction latency can be measured at a client device by measuring time intervals between user inputs and corresponding feedback, such as video frames responsive to the user inputs. Feedback can comprise communication bursts received at the client device. The communication bursts can be detected and correlated with user inputs in order to measure interaction latency. Feedback can also comprise video response features which are responsive to the user inputs. Received video frames can be analyzed to discover response features, and video frames including the response features can be correlated with user inputs in order to measure interaction latency.

20 Claims, 9 Drawing Sheets

INTERACTIVE LATENCY MEASUREMENT

TECHNICAL FIELD

The subject application is related to latency measurement in communication networks, including fifth generation (5G) and subsequent generation cellular communication networks, and to measuring interaction latency for cloud based video games in particular.

BACKGROUND

Cloud gaming has been gaining popularity. In a typical cloud gaming scenario, a client device connects to a remote server device that hosts a cloud gaming application. The client device receives video game inputs from a user, and the client device transmits the inputs to the server device. The server device can be referred to as a "cloud" server. The cloud gaming application at the cloud server conducts video rendering in the cloud, and the cloud server streams video frames to the client device.

One strength of cloud gaming is that the client device does not need powerful hardware to play video games. However, the client device does need to have good access to a communication network. The video frames generated by the cloud server should arrive at the client device at a nearly constant rate, e.g., 30 frames per second (fps) or 60 fps, for the client device to not experience any lag or video freeze. If a video frame is delayed and does not arrive before the time it should, e.g., 33 milliseconds (ms) after the arrival of a previous frame, the delayed video frame can become useless to the client device and the client device may try to skip to later received video frames in order to provide the best possible user experience under suboptimal conditions.

State of the art wired and Wi-Fi networks can often, although not always, deliver video frames fast enough to provide good cloud gaming experiences. However, cellular communications networks, such as modern Long Term Evolution (LTE) networks, often experience delays caused by network jitter. As a result, users are likely to have bad cloud gaming experiences when attempting cloud gaming via today's cellular communications networks. While the emergence of 5G cellular communication systems should improve cloud gaming experiences, 5G will also lead to increased user attempts at cloud gaming over cellular communications networks, which accordingly increases the importance of cellular communications networks' ability to provide high quality cloud gaming experiences.

The term "interaction latency" refers to a time interval between receiving an input from a user and displaying a corresponding feedback at the user's display. In cloud gaming, interaction latency is primarily due to the round-trip travel time across a communication network. This is because user inputs travel across the communication network to the cloud server where video feedback is rendered, and the video feedback then returns across the communication network to the user's display. Interaction latency has a significant effect on user experience, as can be appreciated. However, one challenge in developing solutions to shorten interaction latency is the current lack of technologies to effectively measure interaction latency.

Previous approaches to measure interaction latency can be classified into three categories. The first and most obvious approach is to utilize general network latency detection techniques such as "pinging" using Internet Control Message Protocol (ICMP) packets to determine latency. However, pings do not account for several factors that also affect overall interaction latency, such as cloud server processing time, transport protocol processing, and client-side game logic processing. Another issue with pings is that many virtual servers used by today's cloud video game applications cannot be pinged, especially from outside their respective networks.

The second approach is to instrument underlying systems, such as the video game applications themselves or the client and server devices, to make interaction latency measurements. While this approach can theoretically work fairly well, it requires considerable development effort and is therefore not commonly done. Furthermore, proprietary commercial systems such as video game applications and consoles typically do not expose source code or measurement data which would allow assessments of interaction latency information across multiple different systems.

Finally, previous approaches have tried estimating interaction latency by taking many measurements in order to determine average or typical interaction latency. While average interaction latency is useful to a degree, such approaches are not practical for real-time interaction latency measurements in connection with various game actions initiated by the user, and so fall short of providing desired interaction latency information.

In view of the foregoing, there is a need in the industry for improved interaction latency measurement technologies, especially for cloud gaming.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
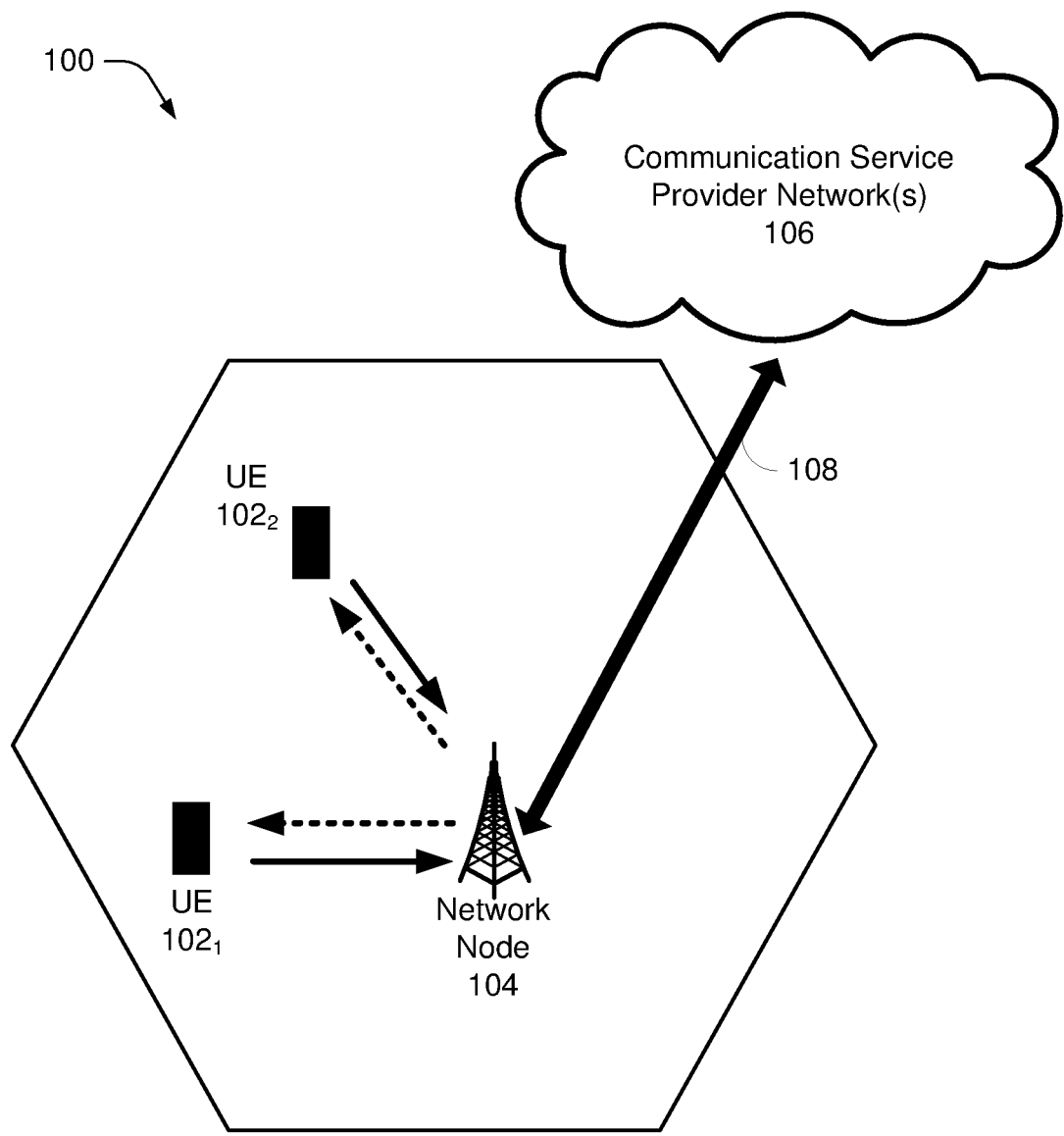
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards techniques to measure interaction latency. Interaction latency can be measured at a client device by measuring time intervals between user inputs and corresponding feedback, such as video frames responsive to the user inputs. In one example approach, feedback can comprise communication bursts received at the client device. The communication bursts can be detected and correlated with user inputs in order to measure interaction latency. In another example approach, feedback can comprise video response features which are responsive to the user inputs. Received video frames can be analyzed to discover response features, and video frames including the response features can be correlated with user inputs in order to measure interaction latency. Hybrid approaches are also feasible, including detection of communication bursts as well as video analysis.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
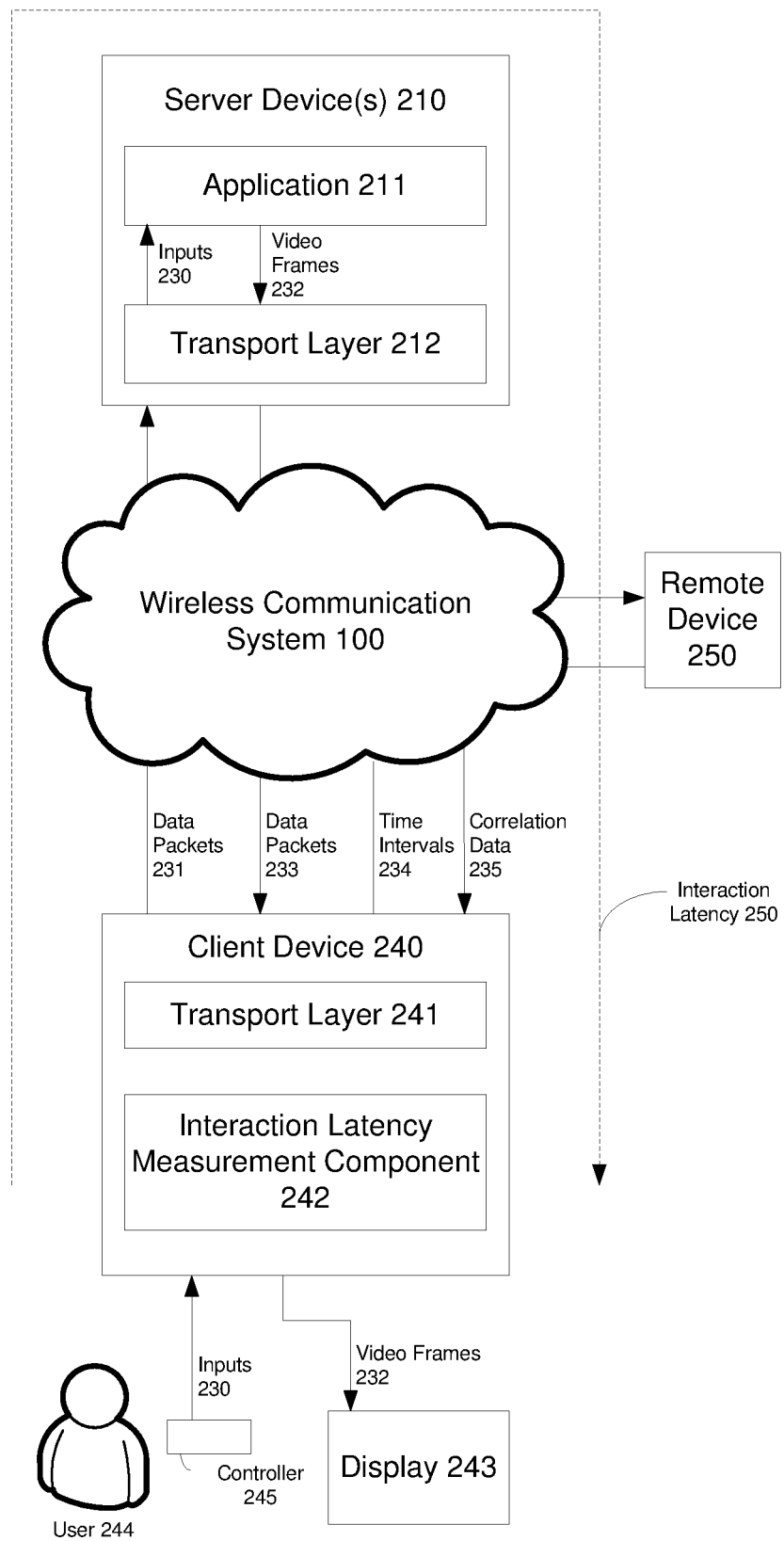
FIG. 2 illustrates an example interaction latency, in accordance with various aspects and embodiments of the subject disclosure.

FIG. 2 illustrates an example interaction latency, in accordance with various aspects and embodiments of the subject disclosure. FIG. 2 includes server device(s) 210, wireless communication system 100, and client device 240. In an example embodiment, the server device(s) 210 and the client device 240 can send and receive the illustrated communications via the wireless communication system 100 described in detail with reference to FIG. 1. In another example embodiment, the client device 240 can comprise or be communicatively coupled with a UE 102, and the server device(s) 210 can comprise or be communicatively coupled with devices in the communication service provider network(s) 106, illustrated in FIG. 1.

FIG. 2 and the various other figures provided herein describe interaction latency measurement techniques in the context of cloud gaming, with the understanding that the disclosed interaction latency measurement techniques can be used in other contexts as well. The interaction latency measurement techniques disclosed herein are particularly useful for cloud gaming and other latency sensitive applications, however, the disclosed techniques are not limited to such applications.

Server device(s) 210 can comprise, inter alia, an application 211 and a transport layer 212. The application 211 can comprise, e.g., a cloud video gaming application or other latency sensitive application. The transport layer 212 can receive and send data on behalf of the application 211. For example, transport layer 212 can receive data packets 231 comprising video game inputs 230 from the client device 240, and transport layer 212 can provide video game inputs 230 to the application 211. Transport layer 212 can furthermore receive video frames 232 from application 211, place the video frames 232 into data packets 233, and send the data packets 233 to the client device 240.

The client device 240 can comprise, inter alia, a transport layer 241 and an interaction latency measurement component 242. The client device 240 can be coupled with a controller 245 operated by a user 244, and a display 243. The client device 240 can receive inputs 230, e.g., video game control inputs, from the controller 245. The transport layer 241 can implement a transport protocol in order to send data packets 231 comprising video game inputs 230 to server device(s) 210. The transport layer 241 can furthermore receive data packets 233 comprising video frames 232 from the server device(s) 210. The transport layer 241 can extract the video frames 232 from the received data packets 233, sequence the video frames 232, and send the video frames 232 to display 243.

The interaction latency measurement component 242 can generally implement the various techniques disclosed herein in order to measure interaction latencies, such as interaction latency 250. Interaction latency 250 can generally include a time measurement of a time period between a respective input of inputs 230 at the client device 240, and a responsive feedback sent from server device(s) 210 and received at the client device 240, such as a respective video frame of video frames 232 which responds to the respective input. Example implementations of the interaction latency measurement component 242 are illustrated in FIG. 3 and FIG. 4.

FIG. 2 also illustrates an example remote device 250 and example data exchanged between the client device 240 and the remote device 250, namely, time intervals 234 and correlation data 235. An example implementation of the remote device 250 is provided in FIG. 7. In general, time intervals 234 can comprise measured interaction latencies, such as interaction latency 250, which can be reported to a remote interaction latency reporting service responsible for tracking and responding to interaction latencies experienced at multiple client devices. Correlation data 235 can comprise data used by the interaction latency measurement component 242 to match inputs of inputs 230 with corresponding server feedback such as data packets of data packets 233 or video frames of video frames 232.

It will be appreciated by those of skill in the art that server device(s) 210 and client device 240 can comprise numerous other elements and features which are not shown in FIG. 2, for simplicity of description.

Figure 3:
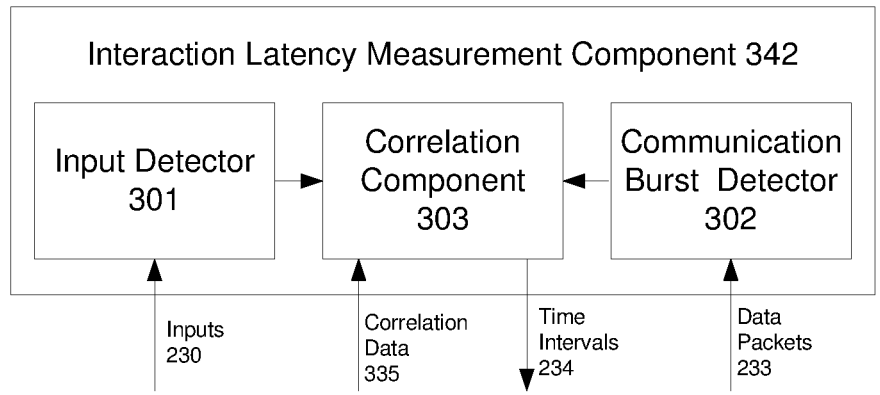
FIG. 3 illustrates an example interaction latency measurement component, in accordance with various aspects and embodiments of the subject disclosure.
Figure 4:
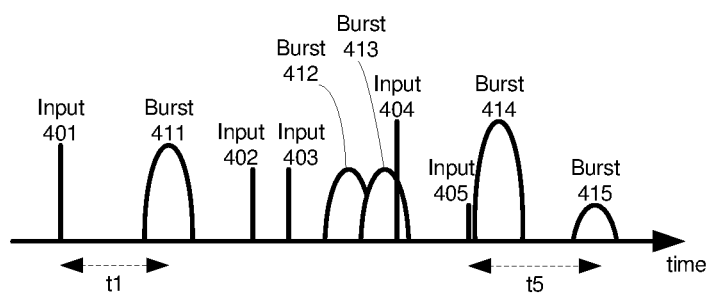
FIG. 4 illustrates an example sequence of inputs and communication bursts which can be correlated to make interaction latency measurements, in accordance with various aspects and embodiments of the subject disclosure.

FIG. 3 illustrates an example interaction latency measurement component, in accordance with various aspects and embodiments of the subject disclosure. Interaction latency measurement component 342 provides one example implementation of an interaction latency measurement component 242 introduced in FIG. 2. Interaction latency measurement component 342 can be configured to correlate inputs 230 with data packets 233, and to measure time intervals 234 between correlated inputs 230 and data packets 233. Interaction latency measurement component 342 can comprise an input detector 301, a communication burst detector 302, and a correlation component 303.

In an example operation of interaction latency measurement component 342, input detector 301 can be configured to detect inputs 230 at the client device 240, and to log times associated with inputs 230. Communication burst detector 302 can be configured to detect communication bursts at the client device 240, e.g., an increase in a rate of arrival of data packets 233 at communication device 240, or an increase in an average size of the data packets 233, or both. Communication burst detector 302 can log times associated with detected communication bursts. Correlation component 303 can receive and apply correlation data 335 in order to correlate detected inputs 230 with detected communication bursts. Correlation data 335 can comprise an implementation of correlation data 235 introduced in FIG. 2. After inputs are correlated with communication bursts, the interaction latency measurement component 342 can then determine time intervals 234 between correlated inputs 230 and communication bursts. Interaction latency measurement component 342 can optionally report the determined time intervals 234, or selected ones of the time intervals 234, to a remote device 250.

In another example operation of interaction latency measurement component 342, input detector 301 can identify a packet 231 containing input information 230 as the packet 231 leaves the client device 240, and input detector 301 can start a timer. Then the interaction latency measurement component 342 can wait for a subsequent communication burst of data packets 233 coming back to the client device 240, which signifies that a significant change has occurred in the video stream, meaning the outgoing input packet has caused some change in the video stream. Interaction latency measurement component 342 can then use the time interval between the input packet being sent out and the communication burst being received to estimate interaction latency.

FIG. 4 illustrates an example sequence of inputs and communication bursts which can be correlated to make interaction latency measurements, in accordance with various aspects and embodiments of the subject disclosure. FIG. 4 illustrates example inputs 401, 402, 403, 404, and 405, as they are received at a client device 240 over time. The illustrated inputs 401, 402, 403, 404, and 405 can comprise, e.g., inputs 230 received at client device 240 from controller 245. FIG. 4 furthermore illustrates example communication bursts 411, 412, 413, 414, and 415, as they are received by client device 240 from server device(s) 210 over time.

In FIG. 4, the height of the inputs 401, 402, 403, 404, and 405 and the communication bursts 411, 412, 413, 414, and 415 is used to visually represent correlation between the inputs 401, 402, 403, 404, and 405 and the communication bursts 411, 412, 413, 414, and 415. Thus, input 401 can be correlated to communication burst 411; inputs 402 and 403, respectively, can be correlated to communication bursts 412 and 413, respectively; input 404 can be correlated to communication burst 414; and input 405 can be correlated to communication burst 415. In an implementation, the determination of which inputs are correlated to which communication bursts can be made partly based on timing: a burst arriving at a known round trip time after a respective input is likely correlated with that respective input. The determination of which inputs are correlated to which communication bursts can also be made partly based on correlation data 335. Correlation data 335 can correlate different input types to different burst profiles.

Figure 7:
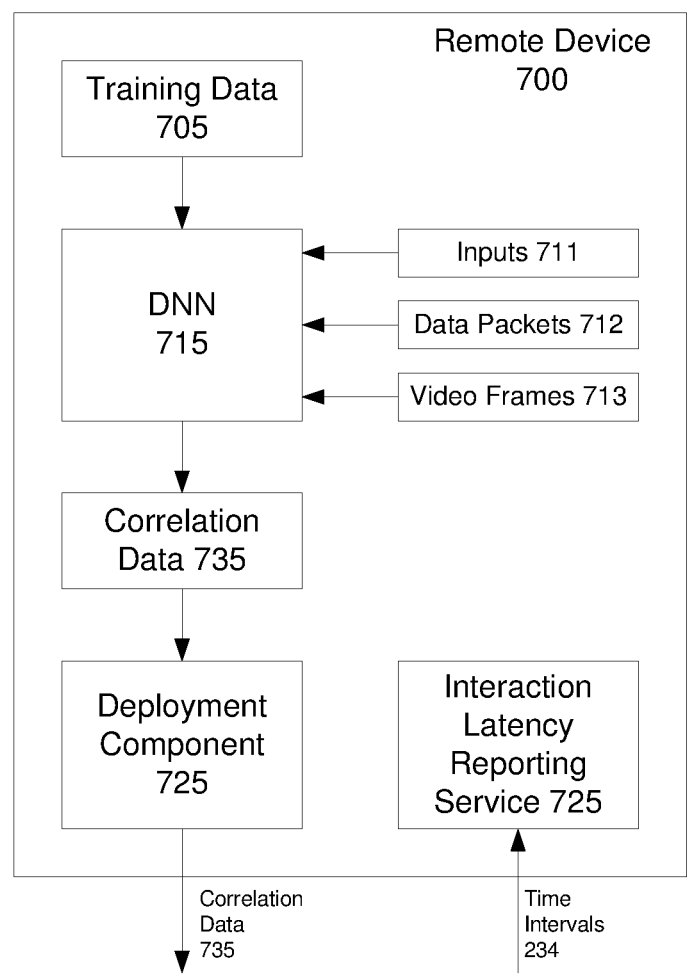
FIG. 7 illustrates an example remote device, in accordance with various aspects and embodiments of the subject disclosure.

Once the inputs 401, 402, 403, 404, and 405 are correlated with the communication bursts 411, 412, 413, 414, and 415, time intervals, e.g., t1 and t5, can be measured between each correlated input-burst pair. The time interval t1 is the time interval between input 401 and burst 411. Any measured time intervals can optionally be reported to remote server 250 as time intervals 234. In an example embodiment, when a time interval such as t5 is anomalous, for example by being significantly longer than other time intervals, or longer than a threshold time interval, then the anomalous time interval t5 can be reported to a remote interactive latency reporting service, such as illustrated in FIG. 7.

Figure 5:
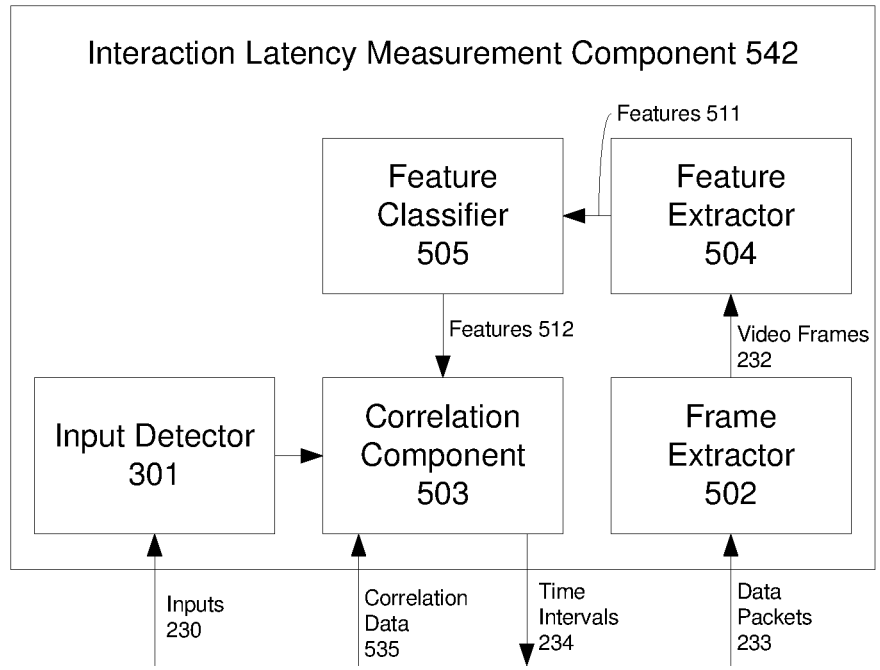
FIG. 5 illustrates another example interaction latency measurement component, in accordance with various aspects and embodiments of the subject disclosure.

FIG. 5 illustrates another example interaction latency measurement component, in accordance with various aspects and embodiments of the subject disclosure. Interaction latency measurement component 542 provides another example implementation of an interaction latency measurement component 242 introduced in FIG. 2. Interaction latency measurement component 542 can be configured to correlate inputs 230 with received data included in data packets 233, such as video frames 232, and interaction latency measurement component 542 can measure time intervals 234 between correlated inputs 230 and video frames 232.

Interaction latency measurement component 542 can comprise an input detector 301, introduced in FIG. 3. Interaction latency measurement component 542 can also comprise a frame extractor 502, a feature extractor 504, a feature classifier 505, and a correlation component 503. In general, the components of FIG. 5 can operate to extract features from received video frames 232 in order to identify a frame comprising a response feature that is responsive to an input of inputs 230. The input can be correlated with the frame comprising the response feature, and the time interval between the two can be measured in order to make an interaction latency measurement.

In an example implementation, frame extractor 502 can extract video frames 232 from data packets 233. The frame extractor 502 can also log a time associated with each extracted video frame of video frames 232. The feature extractor 504 can be configured to extract features 511 from video frames 232, and the feature classifier 505 can be configured to classify at least some of the extracted features 511, in order to produce classified features 512. A wide variety of features can be extracted and classified, and this disclosure is not limited to any features in particular. For example, grid and text features can be extracted and classified as menu features. Certain colors and blur features can be extracted and classified as likely smoke or flash resulting from weapon activation in shooting-type video games. Movement of objects to the right can be extracted and classified as a player look to the left, and vice versa.

Extracted and classified features 512 can be provided to correlation component 503, optionally along with times logged for the video frames 232 from which the features 512 were extracted. Correlation component 503 can correlate inputs 230 with classified features 512. Correlation component 503 can use times associated with the inputs 230 and video frames 232 comprising classified features 512, as well as, optionally, using correlation data 535 to correlate detected inputs 230 with extracted and classified features 512. Correlation data 335 can comprise an implementation of correlation data 235 introduced in FIG. 2, as explained further in connection with FIG. 6.

The interaction latency measurement component 542 can determine time intervals 234 between correlated inputs 230 and the video frames comprising features 512. Interaction latency measurement component 542 can optionally report the determined time intervals 234, or selected ones of the time intervals 234, to a remote device 250.

Figure 6:
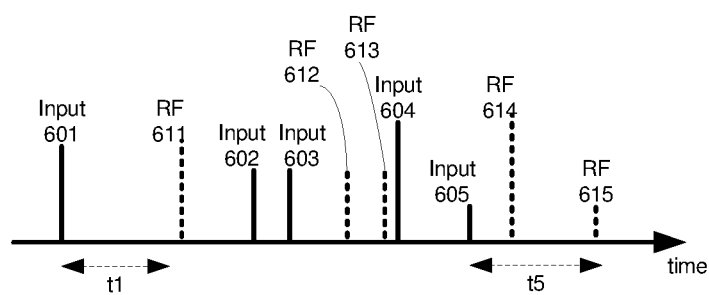
FIG. 6 illustrates an example sequence of inputs and response frames which can be correlated to make interaction latency measurements, in accordance with various aspects and embodiments of the subject disclosure.

FIG. 6 illustrates an example sequence of inputs and response frames which can be correlated to make interaction latency measurements, in accordance with various aspects and embodiments of the subject disclosure. FIG. 6 illustrates example inputs 601, 602, 603, 604, and 605, as they can be received over time. The illustrated inputs 601, 602, 603, 604, and 605 can comprise, e.g., inputs 230 received at client device 240 from controller 245. FIG. 6 furthermore illustrates example response frames 611, 612, 613, 614, and 615, wherein the response frames 611, 612, 613, 614, and 615 can be frames comprising classified features 512 correlated to various different inputs 601, 602, 603, 604, and 605, and wherein the response frames 611, 612, 613, 614, and 615 are illustrated on the timeline at times at which the response frames 611, 612, 613, 614, and 615 were received by client device 240 from server device(s) 210.

In FIG. 6, the height of the inputs 601, 602, 603, 604, and 605 and the response frames 611, 612, 613, 614, and 615 is used to visually represent correlation between the inputs 601, 602, 603, 604, and 605 and the response frames 611, 612, 613, 614, and 615. Thus, input 601 can be correlated to response frame 611; inputs 602 and 603, respectively, can be correlated to response frames 612 and 613, respectively; input 604 can be correlated to response frame 614; and input 605 can be correlated to response frame 615. In an implementation, the determination of which inputs are correlated to which response frames can be made partly based on timing: a response frame arriving near a known round trip time after a respective input is likely correlated with that respective input. The determination of which inputs are correlated to which response frame can also be made partly based on correlation data 535. Correlation data 335 can correlate different input types to different features which can be identified among features 512.

Once the inputs 601, 602, 603, 604, and 605 are correlated with the response frames 611, 612, 613, 614, and 615, time intervals, e.g., t1 and t5, can be measured between each correlated input-response frame pair. In FIG. 6, the time interval t1 is the time interval between input 601 and response frame 611. The time interval t5 is the time interval between input 605 and response frame 615. As in FIG. 3, any of the measured time intervals, and anomalous time intervals in particular, can optionally be reported as time intervals 234 to a remote device 250.

In another example operation of interaction latency measurement component 542, interaction latency measurement component 542 can use visual information processing to detect when an action has taken place in a response frame as a result of an input 230 by the user 244. As in FIG. 3, an input 230 from the user 244 can be detected and the interaction latency measurement component 542 can start a "timer". The interaction latency measurement component 542 can continuously process the stream of video frames 232 and feature extractor 504 can continuously extract identified features, which can be identified for example in correlation data 535. When interaction latency measurement component 542 detects an action in the stream of video frames 232 that corresponds to an expected action from a previous input 230, the arrival time of the video frame comprising the expected action can be used to estimate the overall interaction latency for the action.

Embodiments can combine aspects of FIG. 3 and FIG. 6. For example, the approach of FIG. 3, detecting interaction latency using packet intervals, can be used to build a dataset of frame sequences, and the dataset can be used to identify and label response frames. Such a dataset can be used to train a model to extract response frames automatically, e.g., as described further in connection with FIG. 7. Instead of manually crafting feature extractors corresponding to specific inputs, embodiments can use automatically generated feature extractors to detect response frames in video streams. The various approaches described in connection with FIG. 3, FIG. 6, and combinations thereof can optionally be executed in real time while a video game is being played. The various approaches can be run on a cloud gaming client device 240, or optionally on a separate computing device, such as a network function, as can be appreciated.

Embodiments according to FIG. 3 and FIG. 6 both allow interaction latency measurements for each action resulting in an input 230 in a video game or other application 211 that involves visual feedback. This high level of measurement granularity allows detailed evaluation of the user 244 experience and allows application 211 developers to diagnose where exactly the application 211 fails at providing a good user 244 experience.

Furthermore, embodiments according to FIG. 3 and FIG. 6 need not use source code access or instrumentation of non-user equipment to perform interaction latency measurements. This allows network managers, game developers, and cloud providers to evaluate the user 244 experience under different technology ecosystems without requiring access to proprietary systems.

Moreover, embodiments according to FIG. 3 and FIG. 6 are able to make measurements in real-time as the application 211 is used. This allows network managers and cloud providers to use interaction latency measurement as a feedback mechanism for real-time optimizations they might want to perform, as well as evaluate the user 244 experience in environments where the system and network conditions are changing constantly and changing fast. While interaction latency measurement can be used for cloud gaming, it can also be used in any application or system to calculate the time interval between the user 244 sending an input 230 and seeing feedback on a display 243.

FIG. 7 illustrates an example remote device, in accordance with various aspects and embodiments of the subject disclosure. The example remote device 700 can implement a remote device 250 introduced in FIG. 2. The example remote device 700 provides two separate functions, namely, the interaction latency reporting service 725, and the illustrated correlation data generation and deployment components. These two functions can optionally be implemented at separate remote devices in some embodiments.

In an embodiment, the interaction latency reporting service 725 can be configured to receive time intervals 234 reported by multiple different client devices, such as client device 240. The interaction latency reporting service 725 can store time intervals 234 for each client and application that uses the interaction latency reporting service 725, and the interaction latency reporting service 725 can optionally report, e.g., back to different respective applications, each client's reported time intervals 234.

In embodiments configured for real time responses to anomalous interaction latencies, the interaction latency reporting service 725 can be configured to respond to anomalous time intervals 234 by adjusting a communications system, such as communications system 100, and/or operations of an application 211 in real time. For example, network settings at communications system 100, such as a network slice used for communications between the server device(s) 210 and the client device 240, can optionally be adjusted to address anomalous time intervals 234.

Turning now to the correlation data generation and deployment components illustrated in FIG. 7, in an embodiment, the example remote device 700 can comprise a machine learning component, such as deep neural network (DNN) 715 to generate correlation data 735. The correlation data 735 can comprise, e.g., the correlation data 535 illustrated in FIG. 5, or the correlation data 335 illustrated in FIG. 3, or a combination of the correlation data 535 and the correlation data 335. The deployment component 725 can deploy correlation data 735 to multiple client devices, such as client device 240.

The deep neural network 715 network can be supplied with training data 705 as well as example inputs 711, data packets 712, and video frames 713 associated with an application 211. The deep neural network 715 network can learn from training data 705 and can analyze the example inputs 711, data packets 712, and video frames 713, to identify useful correlation pairs to include in the correlation data 735.

In an example operation of deep neural network 715, the deep neural network 715 can be configured to identify correlated input-burst pairs from among inputs 711 and data packets 712. Training data 705 can correctly identify at least some input-burst pairs, in order to train the deep neural network 715 to correctly identify the input-burst pairs. The identified input-burst pairs can then be included in correlation data 735 for deployment to client devices.

Alternatively or in addition to identifying input-burst pairs, the deep neural network 715 can be configured to identify correlated input-response feature pairs from among inputs 711 and features extracted from video frames 713. Training data 705 can correctly identify at least some input-response feature pairs, in order to train the deep neural network 715 to correctly identify the input-response feature pairs. The input-response feature pairs can then be included in correlation data 735 for deployment to client devices. Of course, in some embodiments, human analysts can also identify input-response feature pairs to include in correlation data 735.

Figure 8:
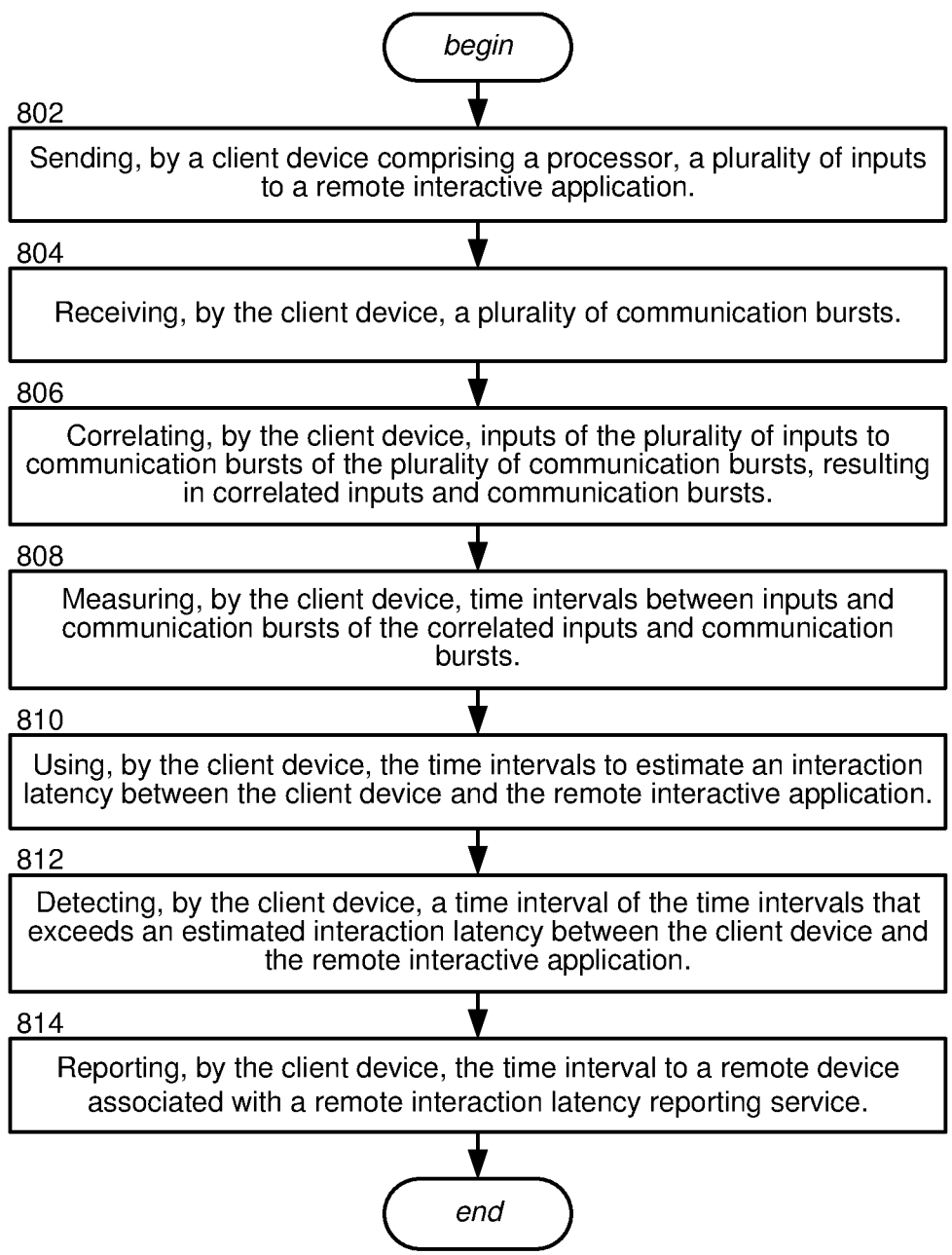
FIG. 8 is a flow diagram representing interaction latency measurement through correlating inputs with communication bursts, in accordance with various aspects and embodiments of the subject disclosure.

FIG. 8 is a flow diagram representing interaction latency measurement through correlating inputs with communication bursts, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a client device 240 equipped with an interactive latency measurement component 242 such as illustrated in FIG. 2. Example operations comprise operation 802, which represents sending, by a client device 240 comprising a processor, a plurality of inputs 230 to a remote interactive application 211. The remote interactive application 211 can comprise, for example, a video game application.

At 804, the client device 240 can receive a plurality of communication bursts. Each communication burst can comprise, e.g., an increased volume of data such as an increased number of streaming video data packets 233 per unit of time, as compared to a background volume of data received at the client device 240 from the remote interactive application 211. The background volume of data can depend on the application 211 and can range, e.g., from near zero to a significant fraction, e.g., 85% or more, of the data volume in a typical communication burst. In an embodiment, the client device 240 can receive the plurality of communication bursts from the remote interactive application 211 via a network device of a cellular communications network 100. Client device 240 can also send the inputs 230 as input packets 231 via the cellular communications network 100.

At 806, the client device 240 can correlate inputs of the plurality of inputs 230 to communication bursts of the plurality of communication bursts, resulting in correlated inputs and communication bursts. The correlation data 235 and/or time information associated with inputs 230 and received communication bursts can be used in connection with correlation operations. At 808, the client device 240 can measure time intervals between inputs and communication bursts of the correlated inputs and communication bursts.

FIG. 4 indicates two example time intervals t1 and t5, between correlated inputs and communication bursts.

At 810, the client device 240 can use the time intervals, e.g., time intervals t1, t5, such as illustrated in FIG. 4, to estimate an interaction latency between the client device 240 and the remote interactive application 211. In some embodiments, estimated interaction latency can be on a per-interaction basis, i.e., a first interaction latency is estimated for a first input-burst pair, a second interaction latency is estimated for a second input-burst pair, etc. In another example embodiment, the client device 240 can combine measured time intervals to calculate, e.g., an average or mean interaction latency. In still further embodiments, the client device 240 can estimate interaction latencies for different input types, or for different times of day, or for different applications 211, or for various different network conditions, etc.

At 812, the client device 240 can detect a time interval of the time intervals that exceeds an estimated interaction latency between the client device 240 and the remote interactive application 211. For example, typical correlated input-burst pairs can generally have a similar, "normal" range of interaction latency. Should a particular input-burst pair exceed the normal range of interaction latency, such an event can be detected at the interaction latency measurement component 242.

At 814, the client device 240 can report the time interval which exceeds the normal interaction latency range, detected at block 812, to a remote device 250 associated with a remote interaction latency reporting service. The client device 240 can report the anomalous time interval and optionally any other time intervals 234, to the remote device 250. The remote device 250 can include a remote interaction latency reporting service 725 such as illustrated in FIG. 7.

Figure 9:
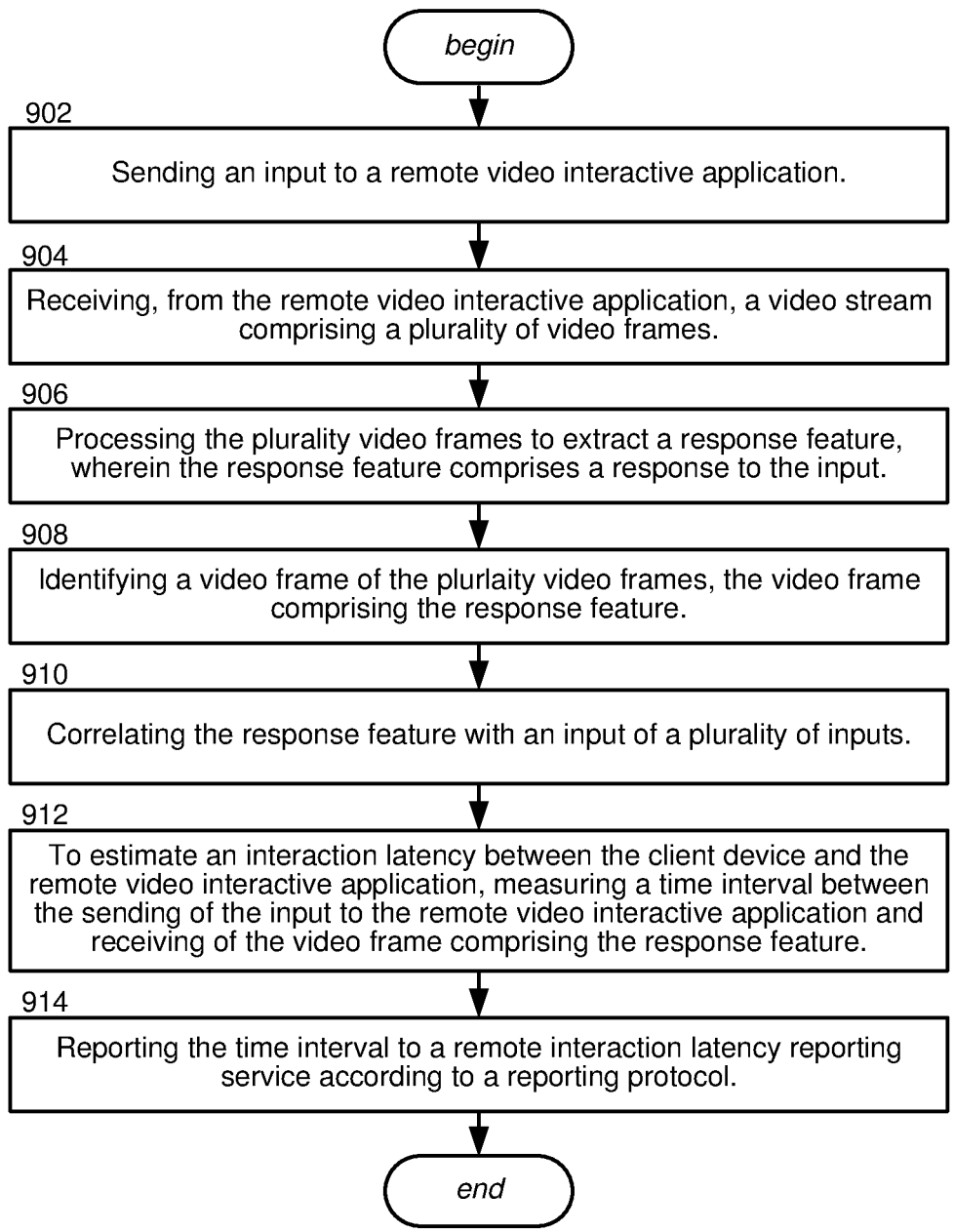
FIG. 9 is a flow diagram representing interaction latency measurement through correlating inputs with video response frames, in accordance with various aspects and embodiments of the subject disclosure.

FIG. 9 is a flow diagram representing interaction latency measurement through correlating inputs with video response frames, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a client device 240 illustrated in FIG. 2. Example operations comprise operation 902, which represents sending an input of inputs 230 to a remote video interactive application 211. Operation 902 can send a plurality of inputs 230 over time such as illustrated in FIG. 6. At 904, client device 240 can receive from the remote video interactive application 211 a video stream comprising a plurality of video frames 232. In at least some network conditions, sending the input to the remote video interactive application 211 and receiving the video stream therefrom can be conducted via a cellular communications network, such as communications system 100.

At 906, client device 240 can process the plurality of video frames 232 to extract a response feature, wherein the response feature comprises a response to the input sent at block 902. The response feature can comprise, e.g., a feature of features 512 classified according to the techniques described in connection with FIG. 5. At 908, client device 240 can identify a video frame of the plurality of video frames 242, the video frame comprising the response feature identified at block 906. At 910, client device 240 can correlate the response feature identified at block 906 with an input of a plurality of inputs sent at block 902.

In an example, operations 906-910 can be performed according to FIG. 5, wherein an interaction latency measurement component 542 can process the video frames 232 with the frame extractor 502, the feature extractor 504, the feature classifier 505, and the correlation component 503. Such processing can identify and classify features 512, wherein each of features 512 is a feature of a video frame of video frames 232. The video frames comprising features 512 are referred to as response frames, because response frames comprise features 512 which are responsive to inputs 230. The correlation component 503 can correlate inputs 230 with response frames comprising features 512.

In an aspect, the processing the plurality of video frames 232 to extract the response features 512 can comprise extracting, by feature extractor 504, multiple features 511 from the multiple video frames 232, and performing, by the feature classifier 505, a feature classification to identify the response features 512 among the multiple features 511 extracted by the feature extractor 504. Example response features 512 can comprise a blur or a color change in at least a portion of a video frame, which can correspond for example to weapon activation inputs, and application menu features, which can correspond to menu access inputs.

At 912, client device 240 can estimate an interaction latency between the client device 240 and the remote video interactive application 211 at least in part by measuring a time interval between the sending of the input (at block 902) to the remote video interactive application 211 and receiving of the video frame (at block 904) comprising the response feature identified at block 906.

At 914, client device 240 can report the time interval measured at block 912 to a remote interaction latency reporting service 725 according to a reporting protocol, for example as illustrated at FIG. 7. The reporting protocol can comprise, e.g., any protocol or communication sequence used to communicate with the reporting service 725.

In an example embodiment according to FIG. 9, client device 240 can measure a plurality of time intervals between sending inputs of inputs 230 to the remote video interactive application 211 and receiving video frames of video frames 232 comprising response features 512. The client device 240 can optionally record and report all of the measured time intervals, and/or combine the plurality of time intervals to estimate an average interaction latency between the client device 240 and the remote video interactive application 211.

Figure 10:
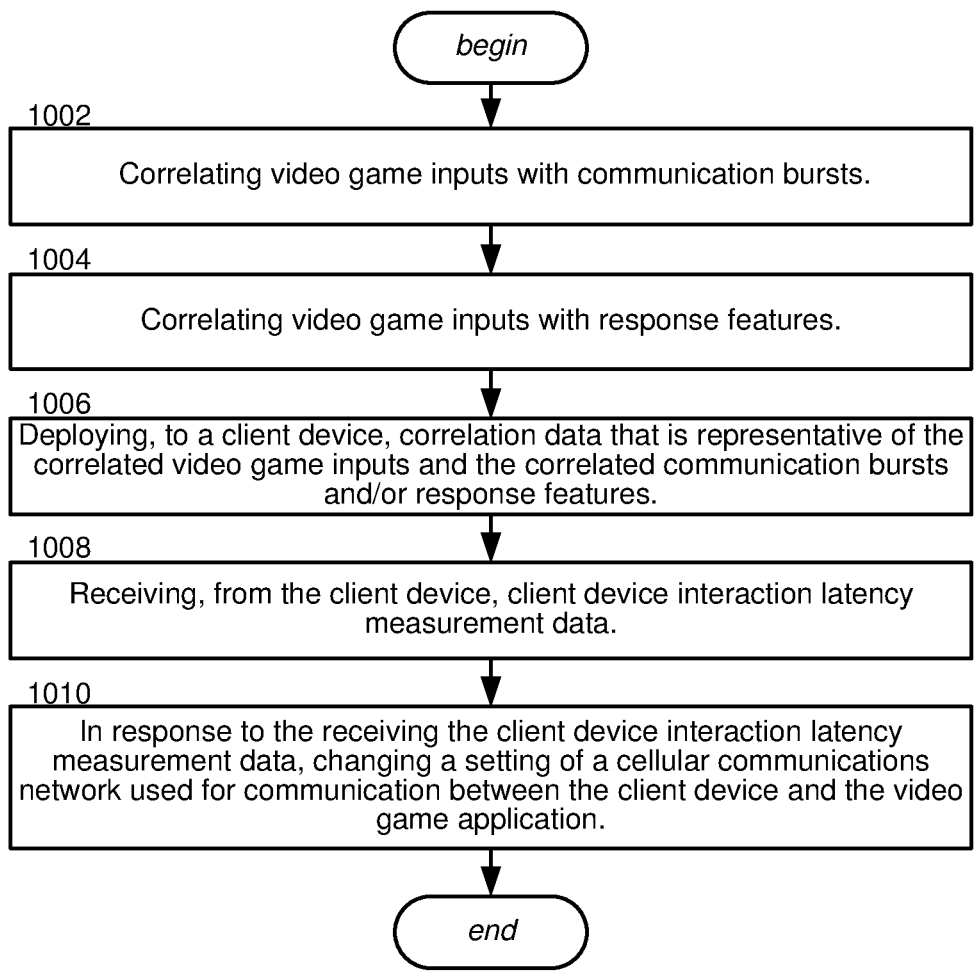
FIG. 10 is a flow diagram representing example operations of a remote device to supply correlation data to client devices, in accordance with various aspects and embodiments of the subject disclosure.

FIG. 10 is a flow diagram representing example operations of a remote device to supply correlation data to client devices, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by remote device 700 such as illustrated in FIG. 7. Example operations comprise operation 1002, which represents correlating video game inputs with communication bursts. For example, a machine learning module such as deep neural network 715 can analyze inputs 711 and data packets 712, in order to correlate one or more of inputs 711 with one or more communication bursts identified in the data packets 712. The inputs can be correlated with communication bursts which are responsive to the inputs. The training data 705 can be used by deep neural network 715 to model its correlations. Each respective communication burst can comprise an increased volume of video frames generated by a video game application, as compared to a background volume of video frames generated by the video game application. As a result of the correlating at operation 1002, the deep neural network 715 can identify input-burst pairs which can be included in correlation data 735.

Operation 1004 represents correlating video game inputs with response features. For example, deep neural network 715 can analyze inputs 711 and video frames 713, in order to correlate inputs of inputs 711 with response features found in the video frames 713. Each response feature can comprise a feature of a video frame generated by a video game application, in response to a video game input of inputs 711. The training data 705 can be used by deep neural network 715 to model its correlations. An example correlation can comprise a video game weapon activation input, correlated with a response feature comprising a blur or a color change in at least a portion of a video frame generated by the video game application. Another example correlation can comprise an input to open a menu for the video game application, and a correlated response feature comprising a menu for the video game application in at least a portion of a video frame generated by the video game application. As a result of the correlating at operation 1004, the deep neural network 715 can identify input-response feature pairs, namely correlated video game inputs and correlated response features, which can be included in correlation data 735.

Operation 1006 represents deploying, to a client device 240, correlation data 735 that is representative of the correlated video game inputs 711 and the correlated communication bursts and/or response features. The correlation data 735 can be deployed to multiple client devices such as client device 240.

Operation 1008 represents receiving, from the client device 240, client device interaction latency measurement data. Client devices such as client device 240 can use received correlation data 735 in connection with their interaction latency measurements, and client devices can then report interaction latency measurement data, e.g., time intervals 234, back to the interaction latency reporting service 725 at the remote device 700. The reported time intervals 234 can be representative of time intervals between sending video game inputs of the correlated video game inputs (represented in correlation data 735) to the video game application 211 and receiving response features of the correlated response features (also represented in correlation data 735) from the video game application 211.

Operation 1010 represents, in response to the receiving the client device interaction latency measurement data at block 1008, changing a setting of a cellular communications network, e.g., a communication system 100, used for communication between the client device 240 and the video game application 211. For example, the interaction latency reporting service 725 can update settings of a cellular communications network in real time in response to interaction latencies that are anomalous or otherwise over a threshold value.

Figure 11:
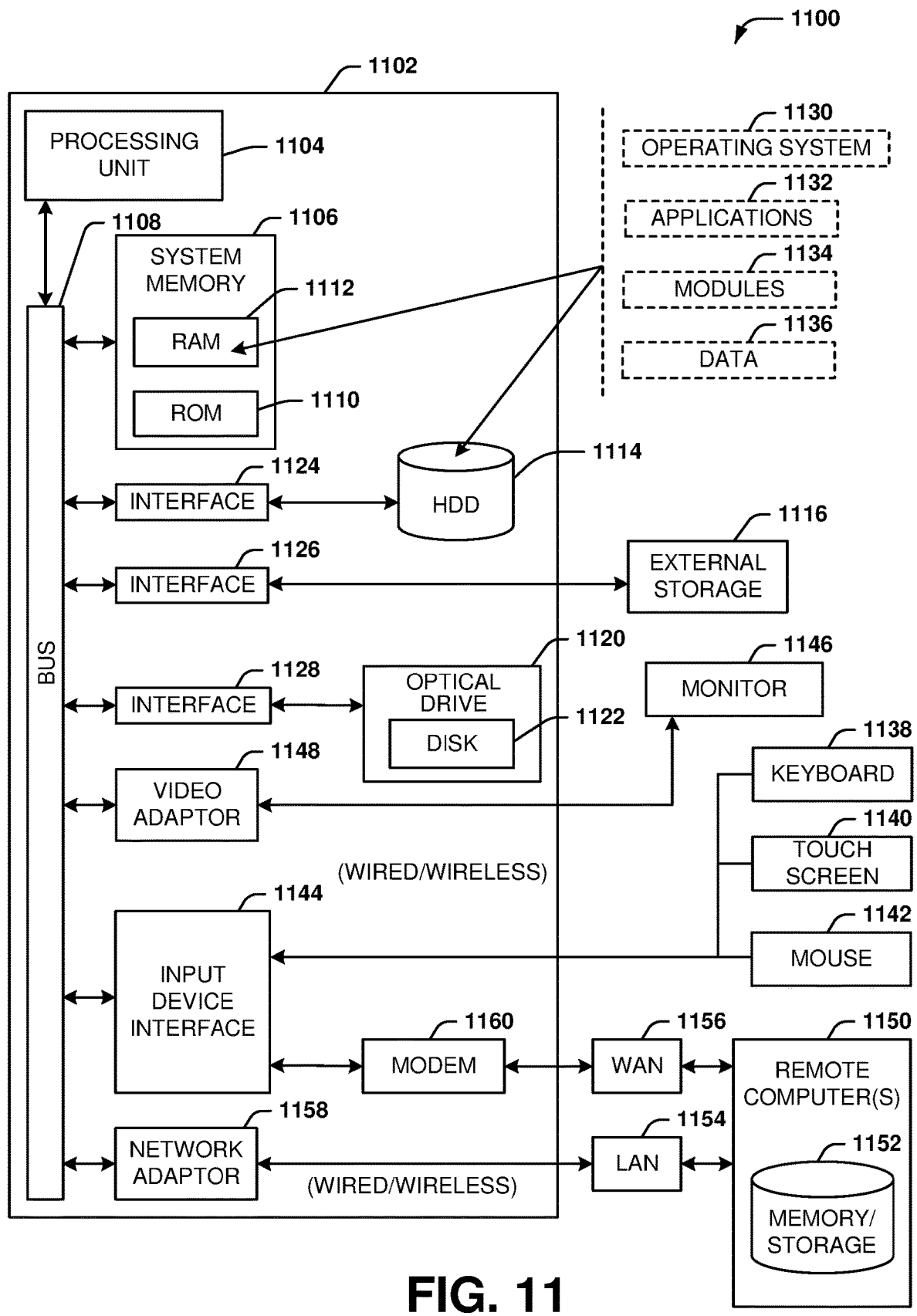
FIG. 11 is a block diagram of an example computer that can be operable to execute processes and methods in accordance with various aspects and embodiments of the subject disclosure.

FIG. 11 is a block diagram of an example computer that can be operable to execute processes and methods in accordance with various aspects and embodiments of the subject disclosure. The example computer can be adapted to implement, for example, an application server, a UE, a network device, a remote device, or a client device, as described herein.

FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A client device, comprising:
a processor; and
a memory that stores executable instructions that, when executed by the processor, facilitate performance of operations, comprising:
sending an input to a remote video interactive application, wherein the input is sent via an input data packet;
receiving, from the remote video interactive application, response data packets comprising a video stream, wherein the video stream comprises multiple video frames;
processing the multiple video frames to extract a response feature, wherein the response feature comprises a response to the input;
identifying a video frame of the multiple video frames, the video frame comprising the response feature; and
to estimate an interaction latency between the client device and the remote video interactive application, measuring a time interval between the sending of the input data packet to the remote video interactive application and receiving of a response data packet comprising the video frame comprising the response feature.

2. The client device of claim 1, wherein the processing the multiple video frames to extract the response feature comprises extracting multiple features from the multiple video frames, and performing a feature classification to identify the response feature among the multiple features.

3. The client device of claim 1, wherein the response feature comprises at least one of a blur or a color change in at least a portion of the video frame.

4. The client device of claim 1, wherein the input comprises an input to open a menu for the remote video interactive application, and wherein the response feature comprises the menu for the remote video interactive application.

5. The client device of claim 1, wherein the operations further comprise sending a plurality of inputs to the remote video interactive application, and correlating the response feature with a respective input of the plurality of inputs.

6. The client device of claim 1, wherein the operations further comprise reporting the time interval to a remote interaction latency reporting service according to a reporting protocol.

7. The client device of claim 1, wherein the operations further comprise measuring a plurality of time intervals between sending inputs of a plurality of inputs to the remote video interactive application and receiving video frames of a plurality of video frames comprising response features, and combining the plurality of time intervals to estimate the interaction latency between the client device and the remote video interactive application.

8. The client device of claim 1, wherein the sending the input to the remote video interactive application comprises sending the input to the remote video interactive application via a cellular communications network.

9. A method, comprising:
sending, by a client device comprising a processor, inputs to a remote interactive application, wherein the inputs are sent via input data packets;
receiving, by the client device, communication bursts, wherein a communication burst of the communication bursts comprises an increase in a rate of arrival of data packets at the client device;
correlating, by the client device, inputs of the inputs to communication bursts of the communication bursts, resulting in correlated inputs and communication bursts;
measuring, by the client device, time intervals between inputs and communication bursts of the correlated inputs and communication bursts; and
using, by the client device, the time intervals to estimate an interaction latency between the client device and the remote interactive application.

10. The method of claim 9, wherein the remote interactive application comprises a video game application.

11. The method of claim 9, wherein the communication burst of the communication bursts comprises an increased number of streaming video data packets received at the client device.

12. The method of claim 9, wherein the client device receives the communication bursts from the remote interactive application via a network device of a cellular communications network.

13. The method of claim 9, further comprising detecting, by the client device, a time interval of the time intervals that exceeds an estimated interaction latency between the client device and the remote interactive application.

14. The method of claim 13, further comprising reporting, by the client device, the time interval to a remote device associated with a remote interaction latency reporting service.

15. A machine-readable storage medium, comprising executable instructions that, when executed by a processor at a server, facilitate performance of operations, comprising:
correlating, at the server, video game inputs with response features, each response feature of the response features comprising a feature of a video frame generated by a video game application in response to a video game input, the correlating resulting in correlated video game inputs and correlated response features;
deploying, from the server to a client device, correlation data that is representative of the correlated video game inputs and the correlated response features; and
receiving, at the server from the client device, client device interaction latency measurement data representative of time intervals between the client device sending video game inputs of the correlated video game inputs to the video game application and the client device receiving data packets comprising response features of the correlated response features from the video game application.

16. The machine-readable storage medium of claim 15, wherein the correlating the video game inputs with response features comprises using a deep neural network to analyze the video game inputs and the response features.

17. The machine-readable storage medium of claim 15, wherein the correlating the video game inputs further comprises correlating the video game inputs with communication bursts, each communication burst comprising an increased volume of video frames generated by the video game application, as compared to a background volume of video frames generated by the video game application.

18. The machine-readable storage medium of claim 15, wherein the operations further comprise, in response to the receiving the client device interaction latency measurement data, changing a setting of a cellular communications network used for communication between the client device and the video game application.

19. The machine-readable storage medium of claim 15, wherein a video game input of the video game inputs comprises a video game weapon activation, and wherein a response feature correlated with the video game weapon activation comprises a blur or a color change in at least a portion of the video frame generated by the video game application in response to the weapon activation.

20. The machine-readable storage medium of claim 15, wherein a video game input of the video game inputs comprises an input to open a menu for the video game application, and wherein a response feature correlated with the input to open the menu comprises the menu for the video game application in at least a portion of the video frame generated by the video game application in response to the input to open the menu.

\* \* \* \* \*